(12) United States Patent
Barnes et al.

(10) Patent No.: US 8,320,886 B2
(45) Date of Patent: Nov. 27, 2012

(54) INTEGRATING MOBILE DEVICE BASED COMMUNICATION SESSION RECORDINGS

(75) Inventors: Robert John Barnes, Watford (GB); Jamie Richard Williams, Fleet (GB)

(73) Assignee: Verint Americas, Inc., Roswell, GA (US)

( * ) Notice: Subject to any disclaimer, the term of this patent is extended or adjusted under 35 U.S.C. 154(b) by 1036 days.

(21) Appl. No.: 11/752,458

(22) Filed: May 23, 2007

(65) Prior Publication Data
US 2008/0293396 A1   Nov. 27, 2008

(51) Int. Cl.
*H04M 1/725* (2006.01)
*H04W 24/00* (2009.01)
(52) U.S. Cl. .................... 455/412.1; 455/425
(58) Field of Classification Search ............ 455/412.1, 455/405, 466; 370/328–349, 496, 522
See application file for complete search history.

(56) References Cited

U.S. PATENT DOCUMENTS

| | | | |
|---|---|---|---|
| 7,499,700 B2* | 3/2009 | Dillon et al. | 455/423 |
| 2008/0167952 A1* | 7/2008 | Blair | 705/11 |
| 2009/0132476 A1* | 5/2009 | Claudatos et al. | 707/2 |

* cited by examiner

*Primary Examiner* — Melody Mehrpour
*Assistant Examiner* — Emem Stephen
(74) *Attorney, Agent, or Firm* — McKeon, Meunier Carlin & Curfman (57) ABSTRACT

Mobile device based communication sessions are recorded and communicated via a receiver to a session data manager. The session data manager processes received representations of the communication sessions in response to metadata generated on the mobile device. In some embodiments, the session data manager is coupled to a data store that indexes the representations. A server identifies and forwards a stored representation in response to a request from a requester with appropriate access privileges.

16 Claims, 6 Drawing Sheets

INTEGRATING MOBILE DEVICE BASED COMMUNICATION SESSION RECORDINGS

BACKGROUND

1. Technical Field

This application relates generally to recording communication sessions from a mobile device. More particularly, the application reveals systems and methods for integrating recorded communication sessions temporarily stored on a mobile device with a recording infrastructure.

2. Related Art

It is desirable in many situations to retain a record of a communication session. Some communication sessions are voice based and can include any number of participants. An individual may wish to record a thought or directions for review at some later time. One or more persons may wish to record a conversation or a meeting where the participants are located closely to one another. Under other circumstances, the parties to a communication session may be located remotely from one another, such as when one or more persons are talking to one another via telephonic or two-way wireless devices.

Mobile communication devices, such as wireless and cellular telephones, personal digital assistants (PDAs) and portable devices that combine voiced and image based interfaces are becoming increasing popular and indispensable work tools for many individuals. The ubiquitous nature of these multiple function portable devices permits the communication of both audio and visual information. For example, it is common to exchange audio, text, images and even video clips via a mobile phone or a laptop computer. Accordingly, communication sessions can range from a face-to-face conversation to a near real-time exchange of audio and visual information. For example, direct and indirect file transfer, electronic mail, instant messaging and other tools permit the exchange of audio information, text, images or combinations of audio, text and images.

Despite these advances, mobile devices are limited by memory and power storage capacities. Consequently, users of these devices face a recurrent dilemma of what information should remain or be deleted from a portable communication device. In addition, the use of multiple function portable devices increases the probability of encountering situations where desired information regarding a select communication session is no longer available or is difficult to access.

Thus, a heretofore unaddressed need exists in the industry to address the aforementioned deficiencies and inadequacies.

SUMMARY

A mobile communication device is used to record communication sessions. Communication sessions include conversations such as calls connected via a wireless network as well as text, instant messages, images and video. Mobile communication device application software generates metadata that is associated with the recorded communication session. Metadata can be operator directed, automatically generated or both operated directed and automatically generated.

An embodiment of a system for integrating mobile device based communication sessions includes a receiver, a session data manager and a server. The receiver receives a representation of a communication session recorded using a mobile device. The session data manager processes the representation of the communication session in accordance with a parameter associated with the representation. The server communicates the representation in response to a request.

An embodiment of a method for integrating mobile device based communication sessions includes the steps of configuring a receiver to receive a representation of a communication session recorded on a mobile device and processing the representation in accordance with a parameter associated with the representation.

An embodiment of an alternative method for integrating mobile device based communication sessions includes the steps of configuring a receiver to receive a representation of a communication session recorded on a mobile device, processing the representation in accordance with a parameter associated with the representation and communicating the representation via one or more of a file transfer, electronic mail, bus, or wireless protocols.

An embodiment of another method for integrating mobile device based communication sessions includes the steps of configuring a receiver to receive a representation of a communication session recorded on a mobile device, processing the representation in accordance with a parameter associated with the representation and communicating the representation via an audible representation to a voicemail system.

Other systems, devices, methods, features and advantages will be or will become apparent to one skilled in the art upon examination of the following figures and detailed description. All such additional systems, devices, methods, features and advantages are defined and protected by the accompanying claims.

BRIEF DESCRIPTION OF THE DRAWINGS

The present systems and methods for integrating mobile device based communication sessions, as defined in the claims, can be better understood with reference to the following drawings. The components within the drawings are not necessarily to scale relative to each other; emphasis instead is placed upon clearly illustrating the principles involved.

DETAILED DESCRIPTION

A mobile communication device is leveraged by forwarding recorded communication sessions to a data store. Communication sessions include, for example, dictation, conversations, meetings, teleconferences and remote conversations (i.e., sessions conducted via a half duplex radio transceiver), as well as instant messages, text messages, email, images and sessions with both audio and image information.

Metadata generated on the mobile device is associated with a communication session either on the mobile communication device or in an appropriately configured system for integrating representations of communication sessions in the data store. The metadata can be automatically generated using firmware or a software application provided to system users for installation on their mobile devices. Alternatively, the metadata can be generated in response to an operator directed input on the mobile device. The metadata is used to identify, store, index and locate representations of desired communication sessions.

Mobile device based communication sessions are recorded and communicated via a receiver to a session data manager. The receiver is an interface that accepts data via one or more wireless or wired protocols. Alternatively, the receiver can be configured with a microphone input to record audible communications previously stored and played back on a mobile device. The session data manager processes received representations of the communication sessions in response to the metadata. In some embodiments, the session data manager is coupled to a data store that stores the representations in accordance with an index. A server identifies and forwards a stored representation in response to a request from a requester with appropriate access privileges.

A consolidated storage of recorded communication sessions preserves and exposes information that might otherwise be unrecoverable by participants or undiscoverable by non-participants to the respective communication sessions. An accessible store of communication session related information can allow for quality assessment of employees, agents, including feedback that can be used to improve verbal and integrated messaging skills, dispute resolution, and additional benefits.

The server is capable of identifying, retrieving and communicating any number of recordings. A user of the server can request a representation of an identified communication session or any number of related communication sessions. Related communication sessions will share at least one feature.

Embodiments of the present systems and methods as illustrated in the accompanying drawings and described below include a receiver, a session data manager and a server. It should be understood that a skilled individual, after applying the concepts illustrated and described in the present document, could integrate and enable the functions associated with the receiver, session data manager and server in an integrated device.

Figure 1:
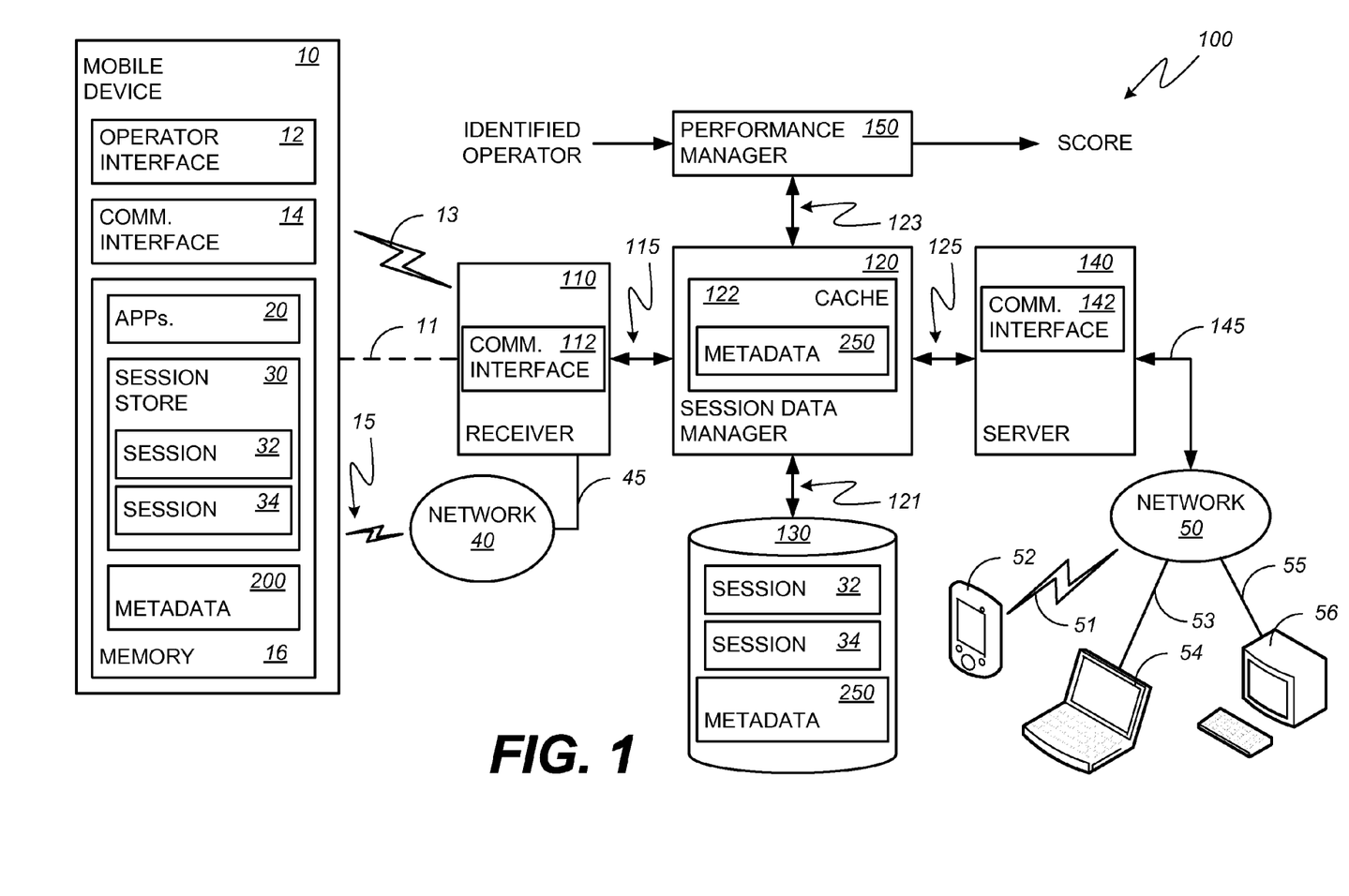
FIG. 1 is a schematic diagram illustrating an embodiment of a system for integrating mobile device based communication sessions.

It should be further understood that the present systems and methods are not limited to single physical devices, that is, in alternative embodiments one or more of receiver 110, session data manager 120, data store 130, server 140 and various wired and wireless interfaces can be duplicated as may be required to permit multiple users to record, forward, store, search and retrieve recorded communication sessions simultaneously. This may be the case when the present systems and methods are coupled and used in conjunction with a work force optimization system that supports an enterprise with hundreds, thousands or even more employees or a communication center with speech and perhaps additional analyzers. Moreover, data store 130 may comprise multiple physical devices distributed across multiple locations.

FIG. 1 is a schematic diagram illustrating an embodiment of a system 100 for integrating mobile device based communication sessions. In the illustrated embodiment, system 100 includes receiver 110, session data manager 120, data store 130 and server 140. System 100 organizes and stores communication sessions received from mobile device 10.

Mobile device 10 is a multiple-function device that records dictation, meetings, telephonic conversations and two-way half duplex conversations. Mobile device 10 includes operator interface 12, communication interface 14 and memory 16. Operator interface 12 includes multiple switches and a display that permit an operator of the device to navigate, select and use various functions supported by the device. Communication interface 14 supports multiple wired and wireless transfers of information. For example, communication interface 14 supports wireless data transfers, which include communications with one or more cellular data/phone networks such as network 40 via link 15, communications with two-way half duplex radios (not shown), and short-range communications with suitably configured peripheral devices using infrared or radio-frequency data links. Short range data links enable communication between wireless devices such as mobile phones, PDAs (personal digital assistants), handheld computers, and wireless enabled laptop or desktop computers and peripherals. Short-range data links further enable data transfers from mobile device 10 to receiver 110 when mobile device 10 is within range of receiver 110, as represented by link 13. Data transfers supported by wired links are represented by temporary link 11, which can be supported by a universal serial bus port or a RS-232 port coupled to communication interface 14 on mobile device 10.

As further illustrated in FIG. 1, memory 16 includes application software (apps.) 20, session store 30 and metadata 200. It should be understood that memory 16 will include storage locations to buffer additional data. Application software 20 enables operator selection and control of a host of functions that permit mobile device 10 to store and forward select communication sessions to system 100 and other operator identified destinations. For example, application software 20 is directed by one or more inputs received via operator interface 12 to record both non-telephonic and telephonic communication sessions on demand. Prior to initiating a recording, application software 20 checks for available memory capacity on mobile device 10. In some embodiments, application software 20 may provide feedback signals via one or mechanisms to the operator of mobile device 10. Feedback signals can indicate any number of conditions in addition to memory capacity that may affect the recording. For example, feedback signals may include a battery condition, a radio-frequency signal condition and other conditions. One or more indicated conditions can trigger application software 20 to instruct the operator to correct the condition before a recording is initiated.

Alternatively, application software 20, in response to one or more recording policies communicated to mobile device 10 or otherwise set in memory 16, directs mobile device 10 to record automatically select communication sessions based on any number of criteria. For example, a recording policy may indicate that calls to specified individuals (e.g., customers) identified by an enterprise directory are to be recorded. An additional recording policy may indicate that calls to phone numbers associated with individuals listed in an operator's personal address book are not to be recorded. By way of further example, a recording policy may include one or more instructions for recording a communication session with an identified participant. For instance, a participant may be associated with an instruction to record telephonic conversations and text messages from a particular participant.

In addition, location information determined for one or more participants of a communication session can be used as an input to decision logic that determines whether the communication session can be recorded. Location information can be derived from a global positioning system receiver in mobile device 10 or from the phone number used to contact each of the participants. Location information can also be used to determine the nature of an acknowledgement from participants that is or is not required before recording the communication session.

Application software 20 is configured to collect automatically information available to populate metadata 200. Application software 20 is further configured to enable an operator of mobile device 10 to enter notes or additional metadata that can be used to identify a present communication session or a previously stored session such as session 32 or session 34. These additional metadata items may be at the discretion of the operator or based on a list of options in a menu identified in response to information about the communication session.

Application software 20 is further configured to enable one or more security measures. For example, application software 20 may direct the mobile device 10 to encrypt stored information associated with the communication session and send an identifier or a key with the communication session information during a data transfer or in a separate communication to receiver 110 to protect the data. Any one of a device identifier, operator identifier, password, or a combination of these may be used in conjunction with known data encryption/decryption algorithms to prevent communication session data from being intercepted and easily used by unintended recipients.

Application software 20 is also configured to associate or otherwise include non-voiced information with the communication session. For example, display information, instant messages, text messages, email, images and video with both audio and image information can be included with a communication session.

Mobile device 10 is configured to store and forward communication sessions. Data transfers from mobile device 10 to receiver 110 can be made via various communication protocols as supported via various wired and wireless media and wired and wireless networks. As illustrated in FIG. 1, receiver 110 is coupled to mobile device 10 via link 11 (wired), link 13 (short-range wireless) and link 15 (cellular/data) via network 40 and link 45. Portions or segments of network 40 can include the public switched telephone network (PSTN). Other portions or segments of network 40 can include any number of routers, switches, repeaters, etc. configured to support asynchronous data packet transfers. Link 45, which couples network 40 to receiver 110, can include one or more segments configured to support Ethernet standards as well as transmission control protocol/Internet protocol (TCP/IP). Data transfers can be initiated from mobile device 10 to other computing devices under the control of the operator or to other users as directed by an operator of mobile device 10 and or in accordance with operator privileges or policy settings stored in the mobile device 10. Data transfers to other users can be completed via any of the above described links and data transfer protocols.

Communication interface 112 is configured to support the receipt of recorded communication sessions from mobile device 10 via one or more of the described links and data transfer protocols. For example, under appropriate circumstances communication interface 112 is configured to support data transfers via file transfer protocol (FTP), one or more electronic mail protocols and short-range wireless data transfer protocols. When a secure connection to system 100 is desired, a hardware or software enabled firewall may be integrated in the links between mobile device 10 and receiver 110. Moreover, when a wired link such as link 11 is available between mobile device 10 and communication interface 112, voiced information generated by a playback function on mobile device 10 can be used to transfer the voiced information to a suitably configured voice mail system or other recorder coupled to receiver 110.

Session data manager 120 is coupled to receiver 110 via link 115. Session data manager 120 includes an internal memory or cache 122 to facilitate real-time data transfers of communication sessions with receiver 110 and server 140. Cache 122 is also available to store metadata 250. Session data manager 120 indexes or otherwise controls the long term storage of communication session information in data store 130. Session data manager 120 is also coupled to data store 130 via link 121. As indicated in FIG. 1, data store 130 holds communication sessions received from mobile device 10 such as session 32 and session 34 as well as metadata 250 related to the respective sessions and their receipt and integration into system 100. Although metadata 250 is shown separate from session 32 and session 34, metadata 250 can be integrated or otherwise stored with the information for each session. Moreover, metadata 250 can be used by a database management system (not shown) to identify and locate a specific stored session as well as multiple stored sessions that share one or more common traits.

Session data manager 120 is further coupled to performance manager 150 via link 123. Performance manager 150 is a hardware device that generates a score or value as a function of information retrieved and processed from session data manager 120 and an identified operator, such as the operator of mobile device 10. Information retrieved from session data manager 120 includes voice-based communication sessions, text, document files, images, video segments, etc. Performance manager 150 may include a player, speech analyzer and other analyzers or tools for identifying and processing pertinent information from data store 130.

The speech analyzer (not shown) searches for phonemes, words or phrases, in any combination including exact phrases, and/or sets of phonemes, words, or phrases that are uttered within a set period of time. When search criteria include a combination, the combination may be nested, logically combined and/or related in time. For example, "A" within N seconds of "B."

In the illustrated embodiment, the system 100 receives recorded communication session and communication session related information from mobile communication device 10. System 100 can be further integrated via a customer-center interface (not shown). A customer center coupled to the interface may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example. A customer-center interface is an example of an audio communication session information source that can also be used to populate a store of communication session recordings.

When directed to analyze a recorded communication session, performance manager 150 applies identifying characteristics of the speaker(s) participating in the communication session to the speech analyzer (not shown) to generate intermediate results. For example, where the identity of the speaker is known, a speaker dependent language model may be applied; similarly, if the country, city or other geographic region from which the customer is calling is known, an appropriate language model may be applied. The intermediate results are then applied to one or more algorithms to generate an operator specific performance score.

Server 140 is coupled to session data manager 120 via link 125. Server 140 receives, translates and communicates previously stored communication sessions via communication interface 142, link 145 and network 50 to one or more operators of network-coupled devices with appropriate access privileges in response to a request from one of the devices. In this regard, server 140, which includes a suitably configured communication interface 142 to support data transfers and requests with both session data manager 120 and devices coupled to network 50 may be configured to serve requested HTML pages or files. Served files can be downloaded by network-coupled devices for later review and playback on the device. Alternatively, server 140 can be configured to communicate information as it is requested.

Each of PDA/phone 52, coupled to network 50 via wireless link 51, laptop 54, coupled to network 50 via link 53 and desktop 56, coupled to network 50 via link 55, includes an operator interface for receiving inputs that define a request.

In the illustrated embodiment, each of the network-coupled devices (PDA/phone 52, laptop 54 and desktop 56) are configured with display devices for observing a graphical rendition of information. It should be understood, that each of the PDA/phone 52, laptop 54 and desktop 56 may have or may be coupled to one or more speakers and suitable electronics for reproducing audible portions of a recorded communication session.

It should be further understood that each of PDA/phone 52, laptop 54 and desktop 56 can produce representations suitable for reproduction via printers and plotters as well as speakers (i.e., audio) and in other formats. Moreover, various representations of communication sessions and metadata can be stored and cataloged for future review and additional analysis.

Figure 2A:
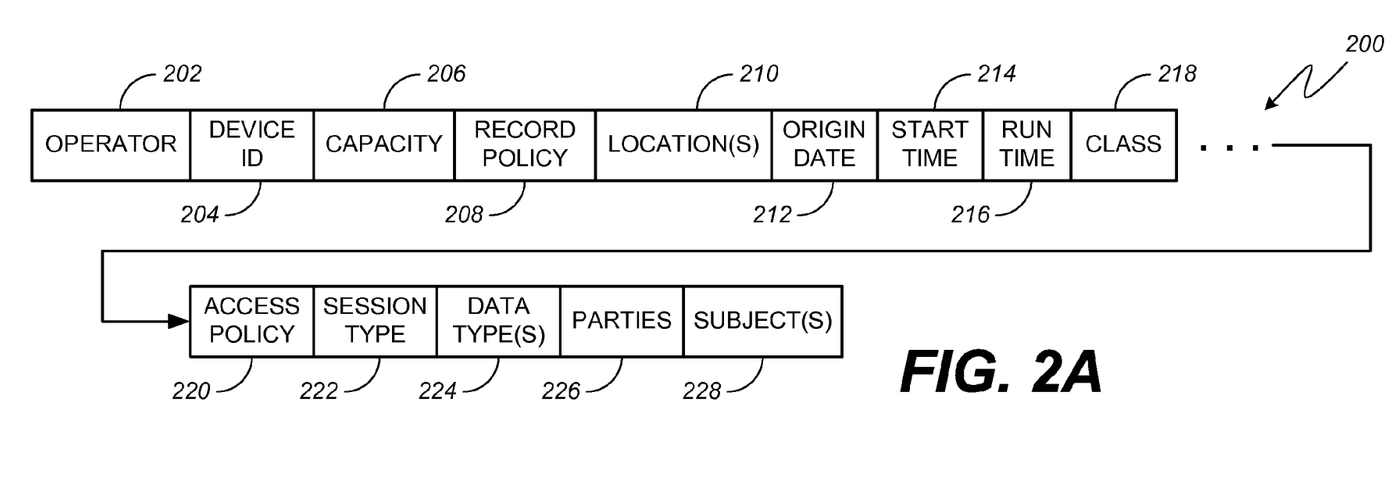
FIGS. 2A and 2B are schematic diagrams illustrating respective embodiments of tables including metadata categories that can be populated and used by components of the system of FIG. 1.
Figure 2B:
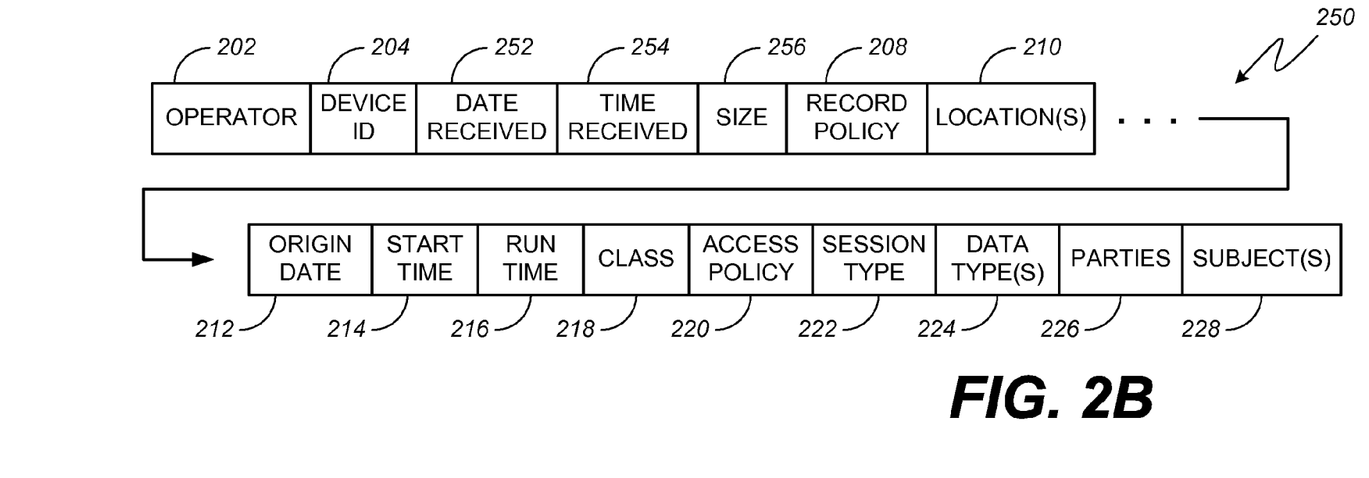

FIGS. 2A and 2B are schematic diagrams illustrating respective embodiments of tables including metadata categories associated records of which can be populated and used by components of the system of FIG. 1. Table 200 (FIG. 2A) is representative of metadata categories that are populated using mobile device 10 (FIG. 1). Although illustrated in Table 200 in a particular order, it should be understood that the metadata categories can be arranged in any order and in multiple collections including more or less categories as may be desired.

As illustrated in FIG. 2A, Table 200 includes operator 202, device identifier 204, capacity 206, record policy 208, location(s) 210, origin date 212, start time 214, run time 216, class 218, access policy 220 session type 222, data type(s) 224, parties 226 and subject(s) 228 categories. Operator 202 includes information identifying the user of mobile device 10. Device identifier 204 includes information identifying the specific mobile device 10 used to record the communication session. Capacity 206 includes information indicating a quantity of unused storage available on mobile device 10. Record policy 208 includes information identifying the conditions under which mobile device 10 will record a communication session. Location(s) 210 includes information identifying the location of the mobile device 10 and participants other than the operator of the mobile device 10.

Under some circumstances, mobile device 10 will record or not record a communication session in accordance with the location of one or more participants of the communication session. When all participants are co-located in a jurisdiction that permits recording, mobile device 10 will record the communication session when storage capacity is available. When one or more participants is located in a jurisdiction that permits recording as long as all participants are informed, mobile device 10 is configured to record the communication session only after receiving an acknowledgement from identified participants at each participating location. When mobile device 10 is located in a jurisdiction that does not permit recording, mobile device 10 will not record the communication session.

Origin date 212, start time 214, run time 216, each include information identifying the start time and length (in real time) of a recorded communication session. Class 218 includes a flag that indicates whether the communication session data is encrypted. When class 218 indicates that the communication session data is encrypted, table 200 will include one or more additional fields such as a public key (not shown) that can be used by session data manager 120 or other devices along with additional information to decrypt the data.

Access policy 220 includes information that defines the circumstances and privileges required to retrieve and review the stored communication session. Session type 222 includes information that describes the nature of the communication session. For example, the recorded communication session could include dictation, a meeting, a telephonic (over a wired or wireless network) conversation, a teleconference (via a conference bridge) or a two-way conversation via a half-duplex wireless medium. Data type(s) 224 include information that identifies the nature of the information that is part of the communication session. Data type(s) 224 can include instant messages, short message service (SMS or text) messages, images, video, voice-based conversations or combinations of these categories. Parties 226 includes information that identifies the participants to a recorded communication session. Subject(s) 228 includes information concerning the topics shared or discussed during the course of the recorded communication session.

Some of the metadata categories include information that is well-suited for application software and/or firmware operative on mobile device 10 to collect and forward along with a recorded communication session. For example, operator 202, device identifier 204, record policy 208, location(s) 210, origin date 212, start time 214, run time 216, class 218, session type 222, data type(s) 224 include information that can be automatically collected via mobile device 10. Other categories may be better suited for population by an operator of mobile device 10. These other categories include, for example, location(s) 210, which include the location(s) of remote parties that are communicatively coupled to mobile device 10 via one or more of the PSTN and a cellular network, parties 226 and subject(s) 228.

Table 250 (FIG. 2B) is representative of metadata categories that are received at or populated by session data manager 120 (FIG. 1). Although illustrated in Table 250 in a particular order, it should be understood that the metadata categories can be arranged in any order and in multiple collections including more or less categories as may be desired.

As illustrated in FIG. 2B, Table 250 includes operator 202, device identifier 204, date received 252, time received 254, size 256, record policy 208, location(s) 210, origin date 212, start time 214, run time 216, class 218, access policy 220, session type 222, data type(s) 224, parties 226 and subject(s) 228 categories. Metadata categories generated by session data manager 120 (FIG. 1) include date received 252, time received 254, and size 256. Date received 252 includes a calendar date when the recorded communication session is received by session data manager 120. Time received 254 includes the time of day when the recorded communication session is received by session data manager 120. Size 256 identifies the storage capacity used by the stored communication session.

Figure 3:
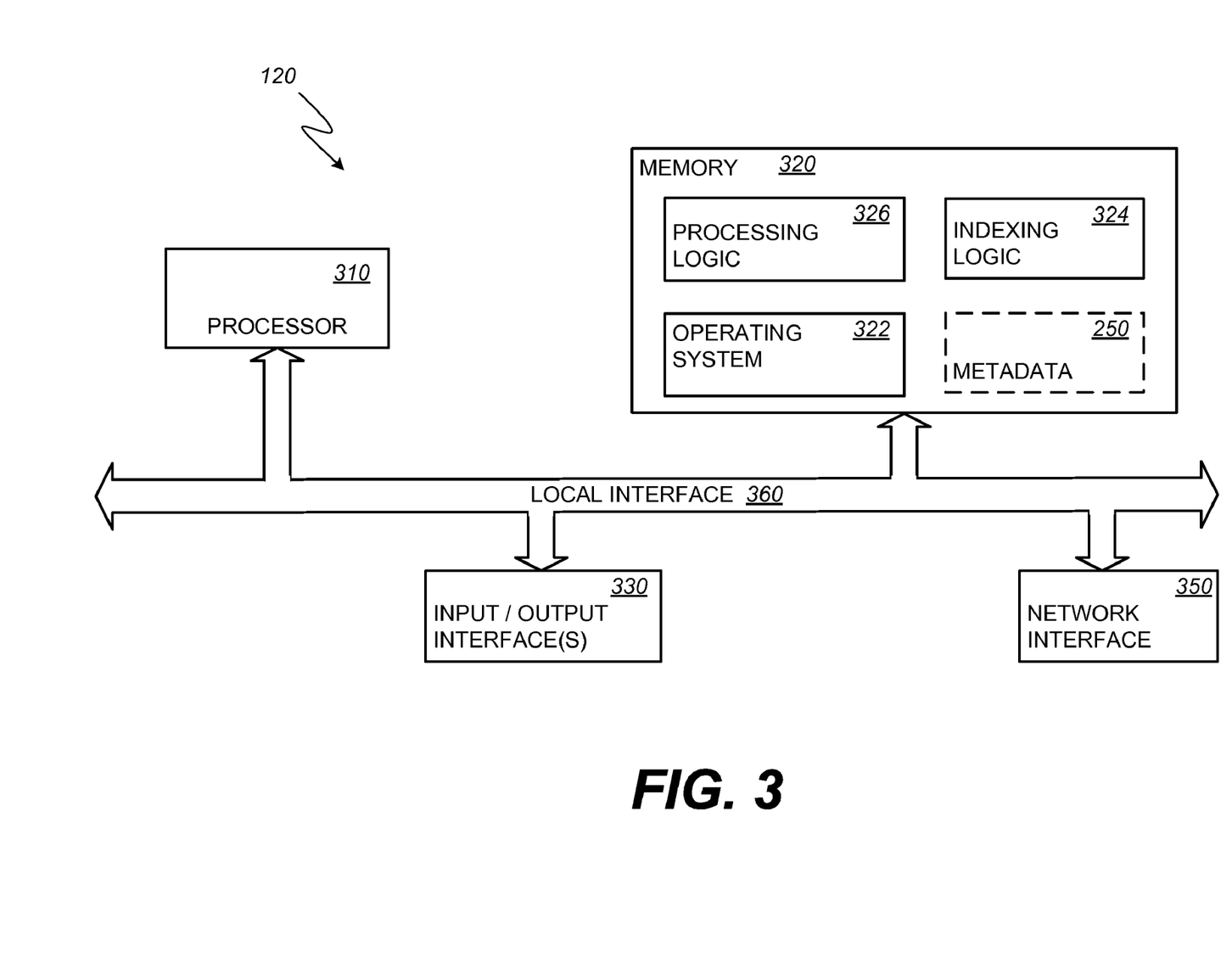
FIG. 3 is a schematic diagram of the session data manager of FIG. 1.

FIG. 3 is a functional block diagram illustrating an embodiment of the session data manager 120 of FIG. 1. Generally, in terms of hardware architecture, as shown in FIG. 3, session data manager 120 is a general purpose computing device or other hardware device that includes processor 310, memory 320, input/output (I/O) interface(s) 330 and network interface 350. Processor 310, memory 320, I/O interface(s) 330 and network interface 350 are communicatively coupled via local interface 360. The local interface 360 can be, for example but not limited to, one or more buses or other wired or wireless connections, as known in the art. The local interface 360 may have additional elements, which are omitted for simplicity, such as controllers, buffers (caches), drivers, repeaters, and receivers, to enable communications. Further, the local interface 360 may include address, control, power and/or data connections to enable appropriate communications among the aforementioned components. Moreover, local interface 360 provides power to each of the processor 310, memory 320, I/O interface(s) 330 and network interface 350 in a manner understood by one of ordinary skill in the art.

Processor 310 is a hardware device for executing software, particularly that stored in memory 320. The processor 310 can be any custom made or commercially available processor, a central processing unit (CPU), an auxiliary processor among several processors associated with session data manager 120, a semiconductor based microprocessor (in the form of a microchip or chip set), or generally any device for executing software instructions.

Memory 320 can include any one or combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the memory 320 may incorporate electronic, magnetic, optical, and/or other types of storage media. Note that the memory 320 can have a distributed architecture, where various components are situated remote from one another, but accessible by the processor 310.

The software in memory 320 may include one or more separate programs, each of which comprises an ordered listing of executable instructions for implementing logical functions. In the example embodiment illustrated in FIG. 3, the software in the memory 320 includes operating system 322, indexing logic 324 and processing logic 326. The operating system 322 essentially controls the execution of other computer programs and provides scheduling, input-output control, file and data management, memory management, communication control and related services.

Indexing logic 324 includes one or more programs and one or more data elements that enable session data manager 120 to convert one or more representations and or metadata associated with respective representations to enable easy access and retrieval of desired representations from data store 130 or cache 122. Indexing logic 324 may include one or buffers and parameter stores for holding configuration information and or data as may be desired.

Processing logic 326 includes one or more programs and one or more data elements that enable session data manager 120 to confirm, store, secure, mine or otherwise manage communication session representations from mobile device 10. Processing logic 326 may include one or more buffers and parameter stores for holding configuration information and or data as may be required to interface with any number of interface devices that may be coupled to session data manager 120.

I/O interface(s) 330 includes multiple mechanisms configured to transmit and receive information via session data manager 120. These mechanisms support human-to-machine (e.g., a keyboard) and machine-to-human information transfers. Such human-to-machine interfaces may include touch sensitive displays or the combination of a graphical-user interface and a controllable pointing device such as a mouse.

Moreover, these mechanisms can include voice activated interfaces that use a microphone or other transducer, among other devices.

Network interface 350 enables session data manager 120 to communicate with various network-coupled devices. Network interface 350 performs a variety of functions including, for example the signal conditioning and format conversions to communicate data. Preferably, network interface 350 is compatible with Ethernet standards (e.g., IEEE 802.3z Fiber Optic Gigabit Ethernet and IEEE 802.3ab Twisted-Pair Gigabit Ethernet) and the TCP/IP protocol. It should be understood that other data-network interfaces compatible with other network protocols including wireless protocols may also be used.

When session data manager 120 is in operation, the processor 310 is configured to execute software stored within the memory 320, to communicate data to and from the memory 320, and to control operations of the session data manager 120 pursuant to the software. The indexing logic 324, processing logic 326, and the O/S 322, in whole or in part, but typically the latter, are read by the processor 310, perhaps buffered within the processor 310, and then executed.

When indexing logic 324, processing logic 326 and metadata 250 are implemented in a memory, as is shown in FIG. 3, it should be noted that these software and data elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, via for example optical scanning of the paper or other medium, then compiled, interpreted or otherwise processed in a suitable manner if necessary, and then stored in a memory device.

In an alternative embodiment, where one or more of the indexing logic 324, processing logic 326 and metadata 250 are implemented in hardware, the indexing logic 324, processing logic 326 and metadata 250 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), flip-flops, etc.

Figure 4:
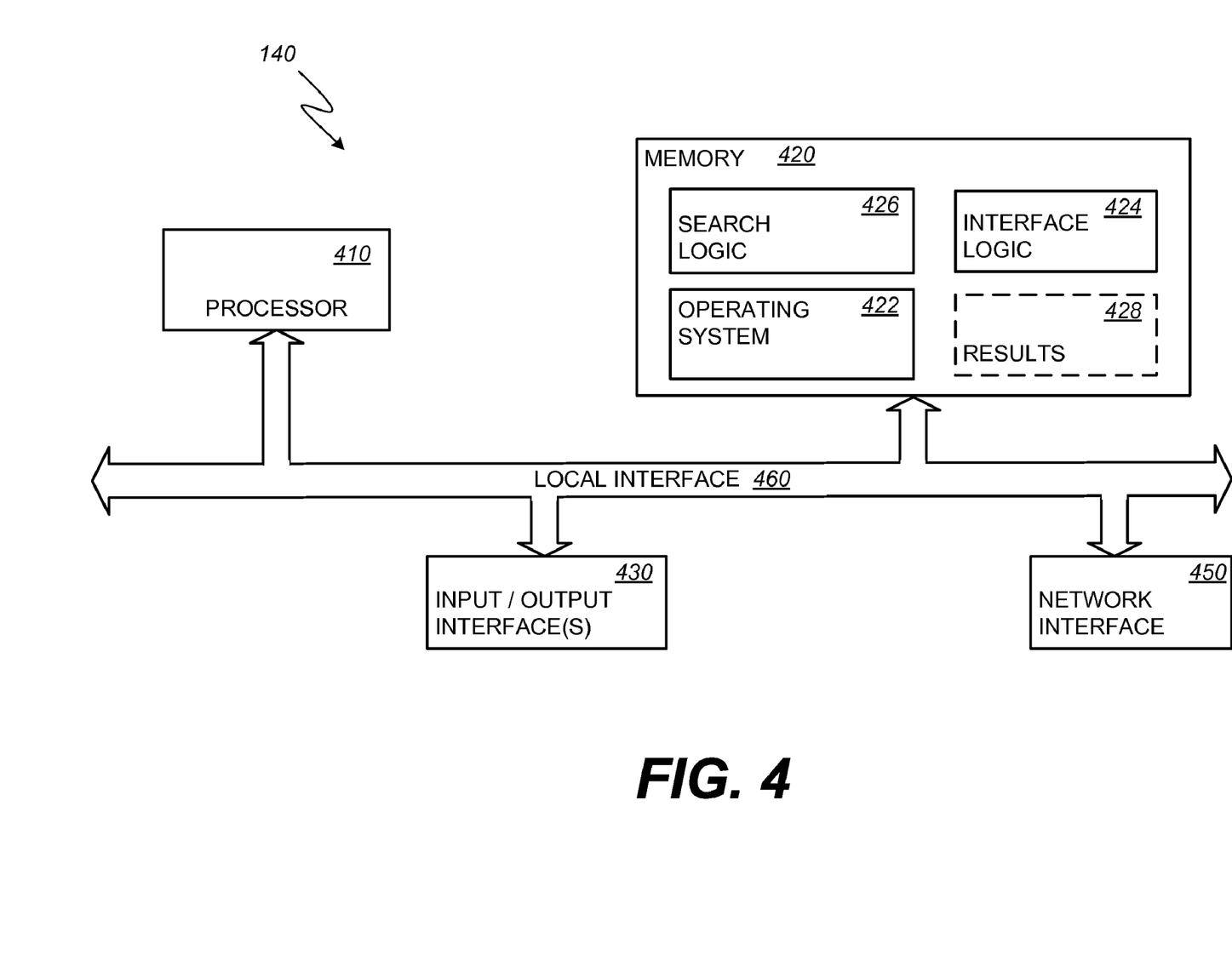
FIG. 4 is a schematic diagram of the server of FIG. 1.

FIG. 4 is a schematic diagram of the server 140 of FIG. 1. Generally, in terms of hardware architecture, as shown in FIG. 4, server 140 is a general purpose computing device or other hardware device that includes processor 410, memory 420, input/output (I/O) interface(s) 430 and network interface 450. Processor 410, memory 420, I/O interface(s) 430 and network interface 450 are communicatively coupled via local interface 460. The local interface 460 can be, for example but not limited to, one or more buses or other wired or wireless connections, as known in the art. The local interface 460 may have additional elements, which are omitted for simplicity, such as controllers, buffers (caches), drivers, repeaters, and receivers, to enable communications. Further, the local interface 460 may include address, control, power and/or data connections to enable appropriate communications among the aforementioned components. Moreover, local interface 460 provides power to each of the processor 410, memory 420, I/O interface(s) 430 and network interface 450 in a manner understood by one of ordinary skill in the art.

Processor 410 is a hardware device for executing software, particularly that stored in memory 420. The processor 410 can be any custom made or commercially available processor, a central processing unit (CPU), an auxiliary processor among several processors associated with server 140, a semiconductor based microprocessor (in the form of a microchip or chip set), or generally any device for executing software instructions.

Memory 420 can include any one or combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the memory 420 may incorporate electronic, magnetic, optical, and/or other types of storage media. Note that the memory 420 can have a distributed architecture, where various components are situated remote from one another, but accessible by the processor 410.

The software in memory 420 may include one or more separate programs, each of which comprises an ordered listing of executable instructions for implementing logical functions. In the example embodiment illustrated in FIG. 4, the software in the memory 420 includes operating system 422, interface logic 424 and search logic 426. The operating system 422 essentially controls the execution of other computer programs and provides scheduling, input-output control, file and data management, memory management, communication control and related services.

Interface logic 424 includes one or more programs and one or more data elements that enable server 140 to convert or otherwise transform data to communicate requests and responses to the requests. Interface logic 424 may include one or buffers and parameter stores for holding configuration information and or data as may be desired.

Search logic 426 includes one or more programs and one or more data elements that enable server 140 to identify, extract, confirm, secure, mine or otherwise manage the transfer of communication session representations from session data manager 120 and data store 130 to one or more devices. Search logic 426 may include one or more buffers and parameter stores for holding configuration information and or data as may be required to interface with any number of interface devices that may be coupled to session data manager 120.

I/O interface(s) 430 includes multiple mechanisms configured to transmit and receive information via server 140. These mechanisms support human-to-machine (e.g., a keyboard) and machine-to-human information transfers. Such human-to-machine interfaces may include touch sensitive displays or the combination of a graphical-user interface and a controllable pointing device such as a mouse. Moreover, these mechanisms can include voice activated interfaces that use a microphone or other transducer, among other devices.

Network interface 450 enables server 140 to communicate with various network-coupled devices. Network interface 450 performs a variety of functions including, for example the signal conditioning and format conversions to communicate data. Preferably, network interface 450 is compatible with Ethernet standards (e.g., IEEE 802.3z Fiber Optic Gigabit Ethernet and IEEE 802.3ab Twisted-Pair Gigabit Ethernet) and the TCP/IP protocol. It should be understood that other data-network interfaces compatible with other network protocols including wireless protocols may also be used.

When server 140 is in operation, the processor 410 is configured to execute software stored within the memory 420, to communicate data to and from the memory 420, and to control operations of the server 140 pursuant to the software. The interface logic 424, search logic 426 and the O/S 422, in whole or in part, but typically the latter, are read by the processor 410, perhaps buffered within the processor 410, and then executed.

When interface logic 424, search logic 426 and results 428 are implemented in a memory, as is shown in FIG. 3, it should be noted that these software and data elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, via for example optical scanning of the paper or other medium, then compiled, interpreted or otherwise processed in a suitable manner if necessary, and then stored in a memory device.

In an alternative embodiment, where one or more of the interface logic 424, search logic 426 and results 428 are implemented in hardware, the interface logic 424, search logic 426 and results 428 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field-programmable gate array (FPGA), flip-flops, etc.

Figure 5:
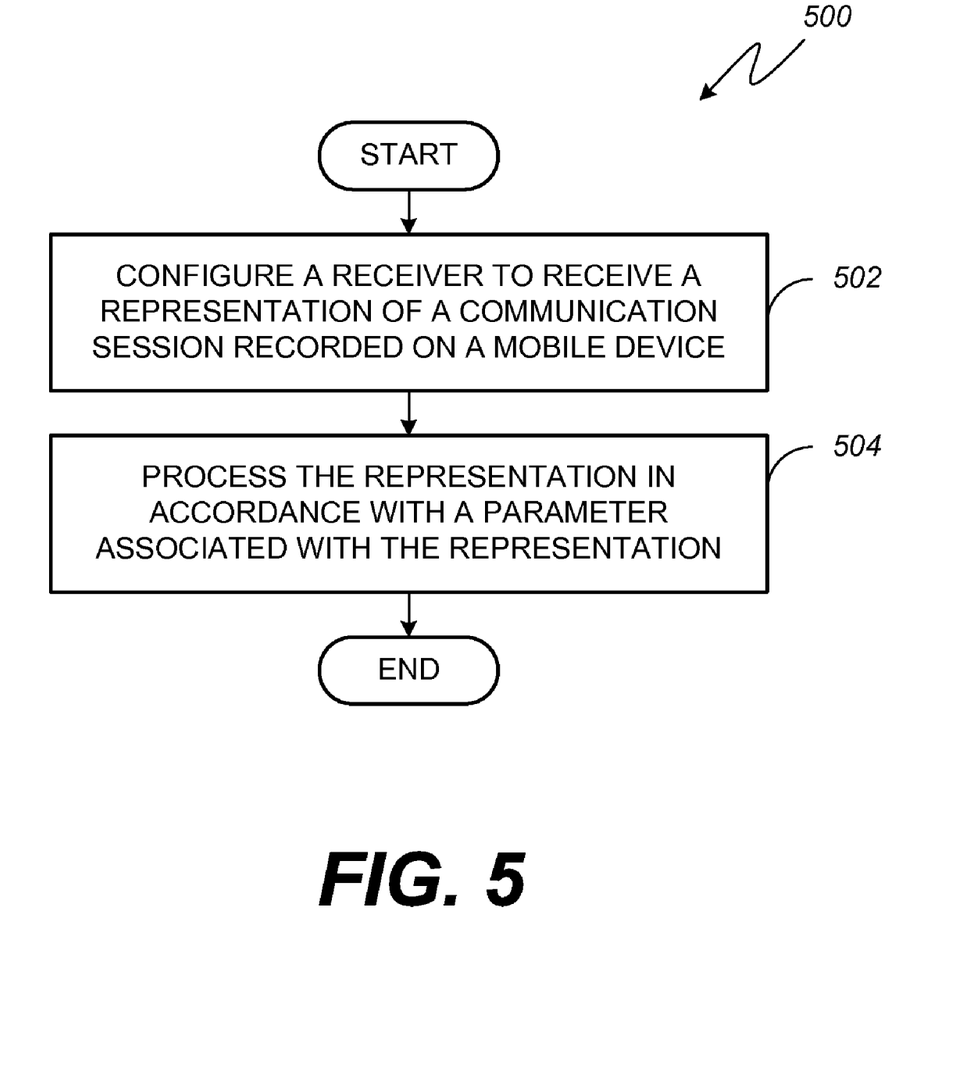
FIG. 5 is a flow diagram illustrating an embodiment of a method for integrating mobile device based communication sessions.

FIG. 5 is flow diagram illustrating an embodiment of a method 500 for integrating mobile device based communication sessions. Method 500 begins with block 502 where a receiver is configured to receive a representation of a communication session recorded on a mobile device. Thereafter, as indicated in block 504, the received representation is processed in accordance with a parameter associated with the representation. As described above in association with FIG. 2, one or more parameters identified in metadata generated on the mobile device or in a session data manager can be used to store, index or archive received representations of communication sessions recorded using a mobile device.

Figure 6:
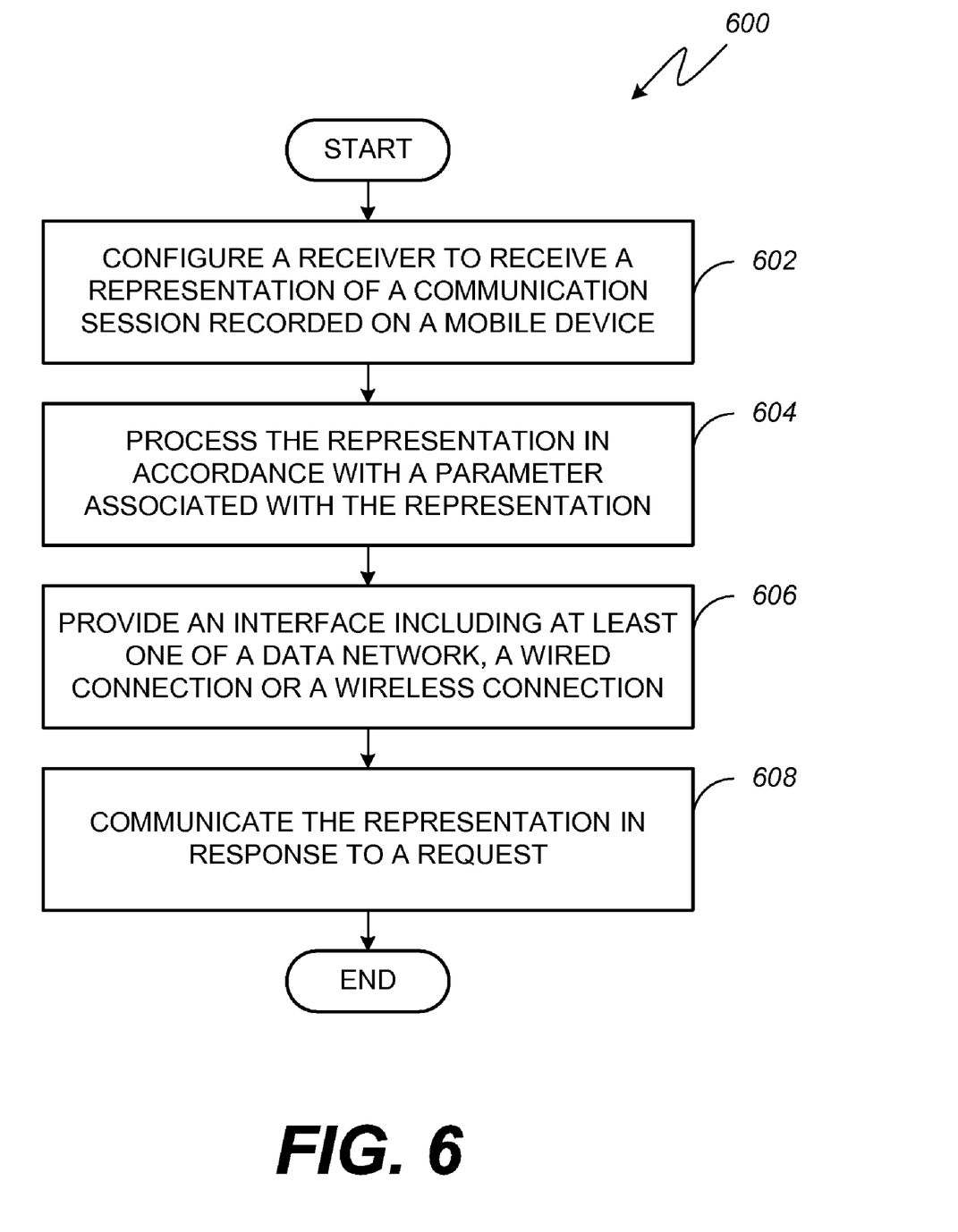
FIG. 6 is a flow diagram illustrating an alternative embodiment of a method for integrating mobile device based communication sessions.

FIG. 6 is a flow diagram illustrating an embodiment of a method 600 for integrating mobile device based communication sessions. Method 600 begins with block 602 where a receiver is configured to receive a representation of a communication session recorded on a mobile device. As described above, the receiver may be configured with various ports configured to communicate data via one or more standard communication protocols. For example, the receiver may be configured to communicate using one or more of Ethernet, Bluetooth, I.E.E.E. 802.11 protocols, as well as data transfers via a data modem or serial bus after connecting the mobile device to the receiver via a suitably configured cable.

Thereafter, in block 604, the representation is processed in accordance with a parameter associated with the received representation. As described previously, any combination of one or more metadata fields can be used to generate an index that enables efficient identification and retrieval of desired communication sessions. In block 606, an interface is provided. The interface provides one or more communication paths via wired or wireless connections. For example, a localized communication path can be supported via a local area network infrastructure, a wired connection or one or more wireless communication protocols that use infrared or radio-frequency data transport mechanisms. By way of further example, a longer range communication path can be supported via wired and wireless networks both separately and in various combinations. Such a longer range communication path could comprise one or more segments with each segment coupled to the next via a suitably configured gateway or bridge. In block 608, the interface communicates the representation in response to a request received via the interface.

Metadata concerning each separate communication session can be forwarded to a search engine or when the communication session includes spoken information to one or more of language, speaker and vocabulary models to adjust a speech analysis engine (not shown). In some embodiments, a user of the system directs a speech analysis engine to use specific language, speaker and vocabulary models. In alternative embodiments, the system uses metadata describing the communication session such as operator and participant identifiers when the communication is a communication session connected through a customer center or is stored and available via an accessible data store. The operator and participant identifiers and perhaps other information can be used to refine the speech analysis engine in real time when metadata identifies the speaker. Generally, a speech analysis engine is trained or otherwise optimized to a cross-section of speakers from the population. Optimization of the speech analysis engine to a population of speakers provides the best result for an unknown or random speaker. However, where sufficient information is available concerning the speech of a specified speaker, the speech analysis engine uses one or more adaptive techniques to evolve or modify to reduce errors between phonemes identified from the present speaker and those observed across a cross-section of a population speaking the same language as the present speaker.

A speech analysis engine can use information returned from a search of spoken communication sessions. For example, the search criterion can be one or more phonemes, words; an exact phrase; concatenated phrases; words/phrases within a user controllable number of seconds of each other in a real-time playback of the recorded communication, etc. A list of synonyms can be applied automatically or as directed by a user to broaden the search if the exact word or phrase uttered is not known. An underlying dictionary and language rules can be applied to convert typed text input into phonetic strings. In addition, a phonetic representation of a word or phrase of interest can be entered to improve accuracy of detection and or to extend the scope of the speech analysis tool to include words or phrases such as product names that may not be covered by the dictionary presently used by the speech analysis engine.

Speech analytics (i.e., the analysis of recorded speech or real-time speech) can be used to perform a variety of functions, such as automated communication session evaluation, scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents or operators adhere to scripts, identify which operators are "good" sales people and which ones need additional training. As such, speech analytics can be used to find operators who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This improves collection effectiveness and reduces corporate liability and risk.

In this regard, various types of recording components can be used to facilitate speech analytics. Specifically, such recording components can perform various functions such as receiving, capturing, intercepting and tapping of data. This can involve the use of active and/or passive recording techniques, as well as the recording of voice and/or screen data (i.e., information displayed on a graphical user interface associated with mobile device 10).

Speech analytics can be used in conjunction with such screen data (e.g., screen data captured from an agent/operator's mobile device or workstation/PC) for evaluation, scoring, analysis, adherence and compliance purposes. Such integrated functionalities improve the effectiveness and efficiency of quality assurance programs. For example, the integrated function can help companies to locate appropriate communication sessions (and related screen interactions) for quality monitoring and evaluation. This type of "precision" monitoring improves the effectiveness and productivity of quality assurance programs.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more of various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities.

Referring back to the collections example outlined above, by using emotion and concept detection, companies can identify which customers are attempting to mislead collectors into believing that they are going to pay. The earlier the company is aware of a problem account, the more recourse options they may have. Thus, the speech analytics of the present disclosure can function as an early warning system to reduce losses.

Additionally, included in this disclosure are embodiments of integrated workforce optimization platforms, as discussed in U.S. patent application Ser. No. 11/359,356, filed on Feb. 22, 2006, entitled "Systems and Methods for Workforce Optimization," and U.S. patent application Ser. No. 11/540,185, filed on Sep. 29, 2006, entitled "Systems and Methods for facilitating Contact Center Coaching," both of which are hereby incorporated by reference in their entireties. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; and/or (6) Coaching—feedback to promote efficient performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

What is claimed is:

1. A system for integrating mobile device based communication sessions, comprising:
   a receiver configured to receive a representation of a communication session recorded and stored in memory on a mobile device, wherein the communication session was between an identified operator of the mobile device and a participant, and was recorded and stored on the mobile device in accordance with a policy having at least a condition that the participant was a specified participant;
   a session data manager coupled to the receiver, the session data manager configured to process the representation of the communication session in accordance with a parameter associated with the representation;
   a performance manager, coupled to the session data manager, that comprises at least one analyzer to automatically generate a score in accordance with information in the representation of the communication session, the information including at least one of voice-based communication sessions, text, document files, images, and video segments; and
   a server coupled to the session data manager, the server configured to communicate the representation in response to a request.

2. The system of claim 1, wherein the representation comprises metadata generated on the mobile device.

3. The system of claim 2, wherein the metadata is responsive to an operator input entered via the mobile device.

4. The system of claim 1, wherein the session data manager is further configured to cache the representation.

5. The system of claim 1, wherein the session data manager is further configured to direct a transfer of the representation to a data store.

6. The system of claim 5, wherein the transfer includes information that associates the representation with at least one participant, a representation type, time, location or subject.

7. The system of claim 5, wherein the data store is responsive to metadata associated with the representation.

8. The system of claim 5, wherein the data store arranges the representation in response to an index.

9. The system of claim 1, wherein the server is configured to communicate information to a client capable of generating a graphical-user interface that enables a user with access credentials to retrieve a desired representation.

10. A method for integrating mobile device based communication sessions, comprising:

configuring a receiver to receive a representation of a communication session recorded and stored in memory on a mobile device, wherein the communication session was between an identified operator of the mobile device and a participant, and was recorded and stored on the mobile device in accordance with a policy having at least a condition that the participant was a specified participant;

processing the communication session at a session data manager coupled to the receiver, the processing performed in accordance with a parameter associated with the communication session;

analyzing the communication session at a performance manager coupled to the session data manager, the analyzing automatically generating a score in accordance with information in the communication session, the information including at least one of voice-based communication sessions, text, document files, images, and video segments; and processing the representation in accordance with metadata associated with the representation and communicated from the mobile device.

11. The method of claim 10, wherein configuring a receiver comprises receiving metadata from the mobile device.

12. The method of claim 10, further comprising:
providing at least one of a data network, a wired connection, or a wireless connection.

13. The method of claim 12, further comprising:
communicating the representation via one or more of a file transfer, electronic mail, or wireless protocols.

14. The method of claim 12, further comprising:
communicating an acoustic translation of the representation to a voicemail system.

15. The method of claim 10, further comprising:
providing a server that identifies and communicates a select communication session in response to a request.

16. The method of claim 10, wherein processing comprises at least one of identifying, storing and indexing.

* * * * *